Feb. 24, 1942.  V. W. PETERSON ET AL  2,274,458
CYLINDER AND METHOD OF MAKING SAME
Filed March 22, 1939
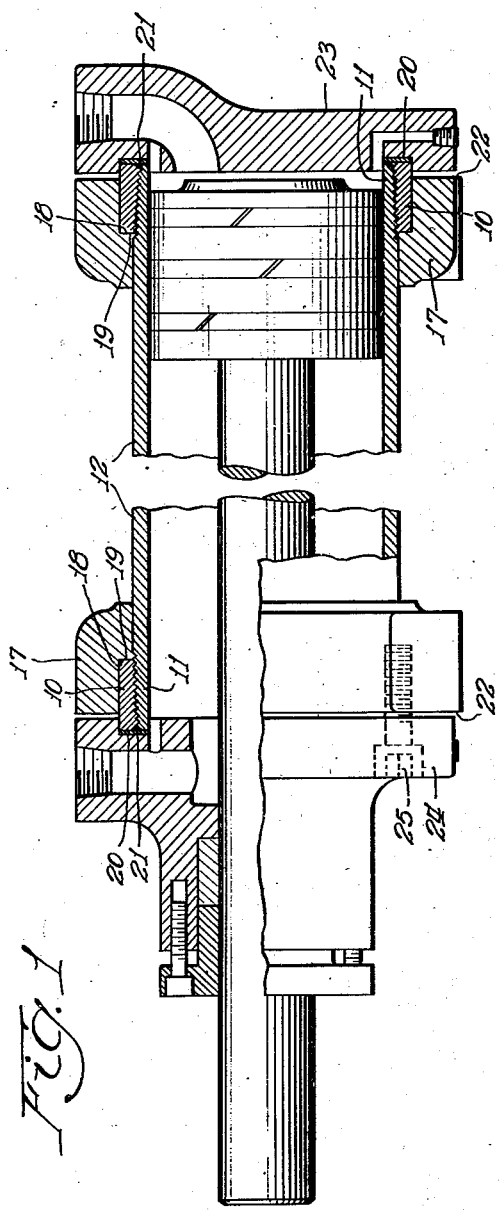
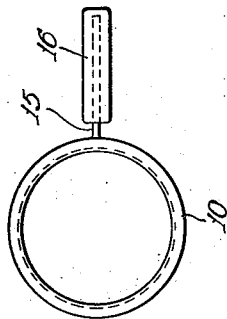
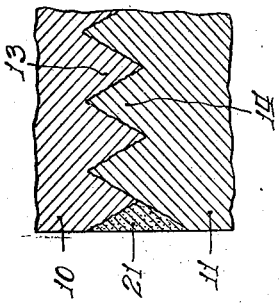
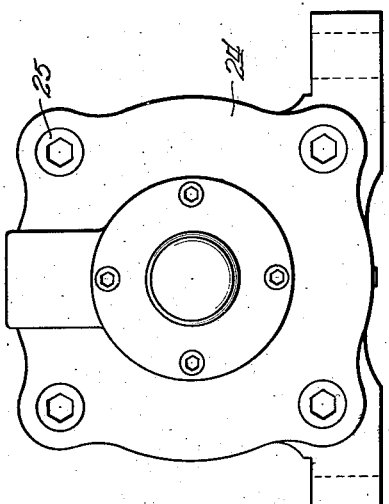
Inventors:
Victor W. Peterson and
Frank J. Daley.
By: Roland C. Rehm
Atty.

Patented Feb. 24, 1942

2,274,458

UNITED STATES PATENT OFFICE 2,274,458

CYLINDER AND METHOD OF MAKING SAME

Victor W. Peterson and Frank J. Daley, Chicago, Ill., assignors to Hannifin Manufacturing Company, Chicago, Ill., a corporation of Illinois Application March 22, 1939, Serial No. 263,443

7 Claims. (Cl. 29—156.4)

This invention relates to hydraulic and other cylinders and, among other objects, aims to provide an inexpensive cylinder capable of use at high pressures without developing leakage at the cylinder heads.

The nature of the invention may be readily understood by reference to one illustrative construction shown in the accompanying drawing.

In said drawing:

Fig. 1 is a longitudinal view partly in section of a cylinder;

Fig. 2 is an end view of the cylinder and cylinder head;

Fig. 3 is a magnified section through the end of the cylinder to illustrate the intimate conformation of the ring threads to the inequalities of the cylinder threads; and Fig. 4 is a view of a retaining ring showing the means for applying the same to the cylinder.

The invention is here shown embodied in a cylinder of the type shown in Peterson Patent No. 2,070,805. That patent discloses a cylinder in which the heads are secured to the cylinder through the agency of rings (referred to in the patent as collars 11) screwed to the threaded ends of the cylinder. Cylinders of this type possess many advantages. They may be made from stock parts and machined and assembled in a very short time compared with that required for cast cylinders, the latter also requiring the keeping of a large number of patterns. For high fluid pressures (1000 to 2000 pounds per square inch), the cylinder itself is made from extra-heavy, or heavier, seamless steel pipe or seamless steel tubing. The cylinder must, of course, be capable of safely withstanding very considerably higher fluid shocks. The rings may be made from stock pipe threaded coupling sleeves whose length is sufficient to permit them to be cut in half to provide two retaining rings. The cylinder is finished on the interior by simple boring and honing operations. Standard tapered pipe threads may be employed for rings and cylinder.

We have found that at high pressures or under the shocks imposed on the cylinder heads by fluid hammer and even by contact with the piston itself, cylinders like that shown in said Peterson patent tend to develop leaks at the cylinder head. Even with only moderately high fluid pressure, the fluid shock caused by inertia of the fluid may develop momentary pressures greatly in excess of normal working pressures. Investigation showed that even when the retaining rings were screwed on the pipe as tightly as it was possible to do so without distorting the pipe, it was nevertheless, impossible to obtain adequate contact between the threaded surfaces. The threaded surfaces were normally rough and this, coupled with variation of thread contours (within permissible tolerances), made intimate contact impossible. The poorly distributed thread pressures thus resulting caused highly concentrated pressures at the isolated points of thread contact. These were sufficient to cause deformation of the threads and thus loosening of the rings (collars) on the cylinder. Apparently the threads on the cylinder were reduced in size and those on the ring widened. Occasionally a thread was sheared.

The loosening of the rings permitted sufficient relative movement between the end of the ring and the end of the cylinder to damage the gasket, eventually cracking it and allowing leakage around the gasket or through the threads themselves. Further tightening of the rings did not correct this difficulty. Indeed, it was impossible to effect substantial additional tightening without deformation of the cylinder or the development of objectionable stresses in the cylinder and rings. Such stresses were at times so great as to break the ring when the latter was subsequently given a machining operation to provide a finished surface. Microscopic examination showed that even when the rings were drawn up on the cylinder as tightly as possible by mechanical means, intimate or uniform contact of the thread surfaces could not be obtained. This was due both to the normal roughness of the threads and to variation in thread contour and taper (within permissible tolerances). Eventually the gaskets would be cracked by loosening of the rings under fluid shock or direct impact of the piston and leakage would occur even between the threads.

We have discovered that practically perfect thread contact between the rings 10 and the threaded ends 11 of the cylinder 12 can be secured by applying the rings when the same are heated to a red heat, i. e. about 1400 to 1500° F., at which temperature the metal is in such condition that it may be stretched without developing residual internal stresses. In this condition, the ring may be screwed on to the cylinder sufficiently far (much farther than it can be screwed when cold by any mechanical means) to bring the entire threaded surfaces into intimate contact. The threads 13 on the ring (in their semi-plastic condition) conform exactly with the roughnesses and inequalities of the threads 14 on the cylinder, thus effecting a perfect thread contact through the entire threaded surface and without creating any residual stresses in either the ring or the cylinder. Preferably the threads should be relatively tapered; either external or internal threads, or both, may be tapered. An effort has been made to illustrate this result in Fig. 3, wherein the threads of the ring conform exactly to the rough surfaces of the threads on the cylinder, the roughness being magnified to permit illustration. The intimate contact effected between the rough threaded surfaces not only seals the threads against leakage but uniformly distributes the thread pressures (developed under high pressure in the cylinder) over the entire threaded surfaces, thereby preventing such concentration of pressure as to cause deformation of the threads. Interlocking of the threaded surface, of course, permanently locks the ring on the cylinder as though it were an integral part thereof.

The heated ring must be screwed into place very quickly after its application to the cylinder and before it cools sufficiently to seize the cylinder. We have illustrated in the drawing one method by which the ring may be manipulated for quick application. As a preliminary step to the application of the ring, a handle in the form of a rod 15 is advantageously welded to the outer periphery of the ring. The ring is then heated to the proper temperature and by the use of the handle can be quickly run up on the threads by hand to such position on the cylinder where the aforesaid intimate contact of the entire threaded surfaces results. In manipulating the ring, a sleeve 16 (such as a short section of pipe) is advantageously slipped over the handle 15 (which is, of course, also in heated condition) so that the ring may be easily manipulated. After the ring is in place, the workman simply breaks off the handle. This may be easily done in its heated condition.

Investigation has shown that the ring may be turned up by hand when in heated condition considerably farther than what is termed normal engagement of tapered pipe threads, i. e., the position to which the threads could safely be screwed if cold, and farther than it can be turned when cold by the most powerful mechanical devices. Furthermore, in such position, because of its heated condition, there is an entire absence of residual stresses in both the ring and cylinder. While we have suggested 1400 to 1500° F. as a proper ring temperature, it will be understood that such temperature is employed as will result in the desired conformation of the threaded surfaces.

It will also be understood that prior to the application of the rings, the cylinder flanges 17 (to which the cylinder heads are subsequently bolted) are slipped over the cylinder.

Preferably the annular surfaces 18 of the flanges and the rear faces 19 of the rings are machined so as to provide proper bearing surfaces. After application of the rings, the ends of the cylinder and rings are preferably machined to provide a flat surface for the cylinder head gaskets 20. Such flat surface may be provided by machining down the cylinder ends and rings to remove the V-shaped groove which generally occurs as a result of the bevelled contour at the edge of the ring and cylinder. As an alternative, this groove may be eliminated by a fillet weld 21, after which the end of the cylinder and ring is machined to provide a flat surface for the gasket 20.

It should be understood that the cylinder head flanges 17 are so designed that their outer faces 22 do not contact with the respective cylinder heads 23 and 24, thereby allowing clearance for drawing up the cylinder heads by the bolts 25.

Obviously the invention is not limited to the details of the illustrative construction since these may be variously modified. Moreover, it is not indispensable that all features of the invention be used conjointly since various features may be used to advantage in different combinations and sub-combinations.

Having described our invention, we claim:

1. The method of applying a metallic ring element to a cylinder element formed of relatively thin walled metal pipe or the like which comprises forming a thread having minute irregularities on the exterior of one of said elements and internally threading the other element with threads of the same pitch, said threads being tapered relative to each other and adapted to be screwed up into binding relation when the elements are cold, heating the internally threaded element until the metal of its threaded area is semi-plastic so that it may be stretched and permanently distorted, and then, while said element is so heated and the other element is cold, screwing said elements together substantially beyond the point to which the threads could be screwed up into binding relation if both elements were cold to cause the internally threaded element to stretch and the soft heated metal thereof to distort during the screwing operation so as to conform to the threads and the minute irregularities thereof on the externally threaded element.

2. The method of applying an external metallic ring element to a cylinder element formed of relatively thin walled metal pipe or the like which comprises forming a thread having minute irregularities on the exterior of the pipe and internally threading the ring element with threads of the same pitch, said threads being tapered relative to each other and adapted to be screwed up into binding relation when the elements are cold, heating the ring element until the metal of its threaded area is semi-plastic so that it may be stretched and permanently distorted, and then, while the ring is so heated and the pipe is cold, screwing the ring element on the threads on said pipe element substantially beyond the point to which the threads could be screwed up into binding relation if both elements were cold to cause the ring to stretch and the soft heated metal thereof to distort during the screwing operation so as to conform to the threads and the minute irregularities thereof on said pipe element.

3. The method of applying an external metallic ring element to a cylinder element formed of relatively thin walled metal pipe or the like which comprises forming a thread having minute irregularities on the exterior of the pipe and internally threading the ring element with threads of the same pitch, said threads being tapered relative to each other and adapted to be screwed up into binding relation when the elements are cold, heating the ring element until the metal of its threaded area is semi-plastic so that it may be stretched and permanently distorted, and then, while the ring is so heated and the pipe is cold, screwing the ring element on the threads on said pipe element substantially beyond the point to which the threads could be screwed up into binding relation if both elements were cold to cause the ring to stretch and the soft heated metal thereof to distort during the screwing operation so as to conform to the threads and the minute irregularities thereof on said pipe element, and then applying a fillet weld to the exposed ends of the elements to obliterate the terminal thread groove.

4. The method of applying a heat retaining ring or collar to a cylinder adapted to contain a piston and a fluid under pressure by highly intimate thread contact which comprises forming on the exterior of a metal cylinder a thread having minute irregularities, internally threading a metal ring with threads of the same pitch, said threads being tapered relative to each other and adapted to be screwed up into binding relation when the cylinder and ring are cold, heating the ring until the metal of its threaded area is semi-plastic so that it may be stretched and permanently distorted, and then, while the ring is so heated and the cylinder is cold, screwing the ring on the threaded portion of the cylinder substantially beyond the point to which the threads could be screwed up into binding relation if both the ring and cylinder were cold to cause the ring to stretch and the soft heated metal thereof to distort during the screwing operation so as to conform to the threads and the minute irregularities thereof on the cylinder, whereby substantially the entire meshed portions of the threads of the ring and cylinder are in intimate contact and localized concentration of pressure in portions of the threads is avoided.

5. The method of applying an external metallic ring element to a cylinder element formed of relatively thin walled metal pipe or the like which comprises forming a thread having minute irregularities on the exterior of the pipe and internally threading the ring element with threads of the same pitch, said threads being tapered relative to each other and adapted to be screwed up into binding relation when the elements are cold, integrally forming an outwardly extending handle on the ring element, heating the ring element until the metal of its threaded area is semi-plastic so that it may be stretched and permanently distorted, and then, while the ring is so heated and the pipe is cold, manipulating the ring element by means of said handle to screw the ring element on the threads on said pipe element substantially beyond the point to which the threads could be screwed up into binding relation if both elements were cold to cause the ring element to stretch and the soft heated metal thereof to distort during the screwing operation so as to conform to the threads and the minute irregularities thereof on said pipe element, and then removing said handle.

6. A cylinder of the character described comprising in combination a relatively thin tubular cylinder body having a portion provided with external pipe threads having minute irregularities and a ring having internal threads engaged with those of the pipe substantially beyond the point to which the ring could be screwed up into binding relation while cold without distortion of the pipe, the threads of the pipe and ring being relatively tapered, and the mesh of the threads being characterized by distortion of the ring threads to conform intimately to the pipe threads and the minute irregularities thereof, said conformity possessing the characteristics of one which is produced by heating the ring prior to its application to the pipe until the metal of its threaded area is semi-plastic so that it may be stretched and permanently distorted and then, while the ring is so heated and the pipe is cold, screwing the ring on the threads on the pipe substantially beyond the above-named point to cause the ring to stretch and the soft heated metal thereof to distort during the screwing operation to produce said conformity.

7. A cylinder of the character described comprising in combination a relatively thin tubular cylinder body having a portion provided with external pipe threads having minute irregularities and a ring having internal threads engaged with those of the pipe substantially beyond the point to which the ring could be screwed up into binding relation while cold without distortion of the pipe, the threads of the pipe and ring being relatively tapered, a fillet weld at the exposed end of the ring and pipe obliterating the terminal thread groove, and the mesh of the threads being characterized by distortion of the ring threads to conform intimately to the pipe threads and the minute irregularities thereof, said conformity possessing the characteristics of one which is produced by heating the ring prior to its application to the pipe until the metal of its threaded area is semi-plastic so that it may be stretched and permanently distorted and then, while the ring is so heated and the pipe is cold, screwing the ring on the threads on the pipe substantially beyond the above-named point to cause the ring to stretch and the soft heated metal thereof to distort during the screwing operation to produce said conformity.

VICTOR W. PETERSON.
FRANK J. DALEY.

CERTIFICATE OF CORRECTION.

Patent No. 2,274,458. February 24, 1942.

VICTOR W. PETERSON, ET AL.

It is hereby certified that error appears in the printed specification of the above numbered patent requiring correction as follows: Page 3, first column, line 5, claim 4, for "heat" read --head--; and that the said Letters Patent should be read with this correction therein that the same may conform to the record of the case in the Patent Office.

Signed and sealed this 30th day of June, A. D. 1942.

(Seal)

Henry Van Arsdale,
Acting Commissioner of Patents.